(No Model.) 2 Sheets—Sheet 1.
W. W. HUGHES.
HAND TRUCK.
No. 308,362. Patented Nov. 25, 1884.
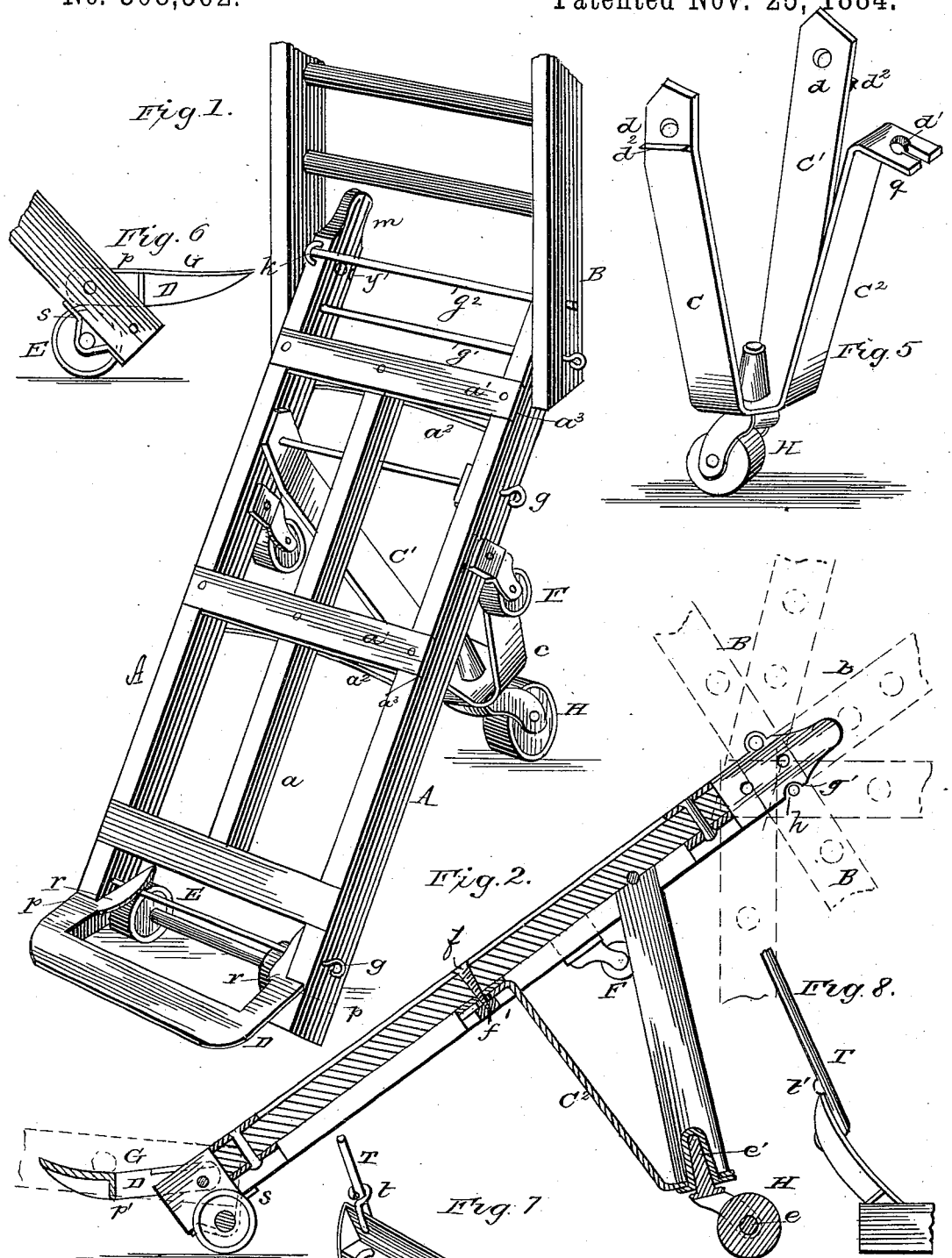
WITNESSES:
Fred. G. Dieterich
Jos. A. Ryan
INVENTOR.
William W. Hughes
By J. N. MacDonald
ATTORNEY
N. PETERS, Photo-Lithographer, Washington, D.C.

(No Model.)  
2 Sheets—Sheet 2.

W. W. HUGHES.
HAND TRUCK.

No. 308,362.  
Patented Nov. 25, 1884.

WITNESSES:  
Fred. G. Dieterich  
Jos. A. Ryan

INVENTOR.  
William W. Hughes  
By J. H. MacDonald  
ATTORNEYS.

UNITED STATES PATENT OFFICE.

WILLIAM W. HUGHES, OF URBANA, OHIO.

HAND-TRUCK.

SPECIFICATION forming part of Letters Patent No. 308,362, dated November 25, 1884.

Application filed January 3, 1884. (No model.)

*To all whom it may concern:*

Be it known that I, WILLIAM W. HUGHES, a citizen of the United States, residing at Urbana, in the county of Champaign and State of Ohio, have invented certain new and useful Improvements in Trucks, of which the following is a specification, reference being had therein to the accompanying drawings.

My invention relates to hand-trucks, and is an improvement on the one granted to me in Letters Patent No. 275,386, April 10, 1883.

The object of the invention is to provide an adjustable and extensible combination-truck, one that is particularly applicable to car and steamboat use, and at the same time can be used for all other truck purposes. To this end it consists in a truck-frame provided with a removable central caster or wheel stand or support detachably connected to the truck-frame. It further consists in one or more end extensions, an end support, a frame provided with forward wheels or rollers and central casters, (two-wheel casters preferred;) and it finally consists in certain details of construction and arrangement of the several parts, as will be hereinafter set forth, and pointed out in the accompanying drawings, in which—

Figure 3:
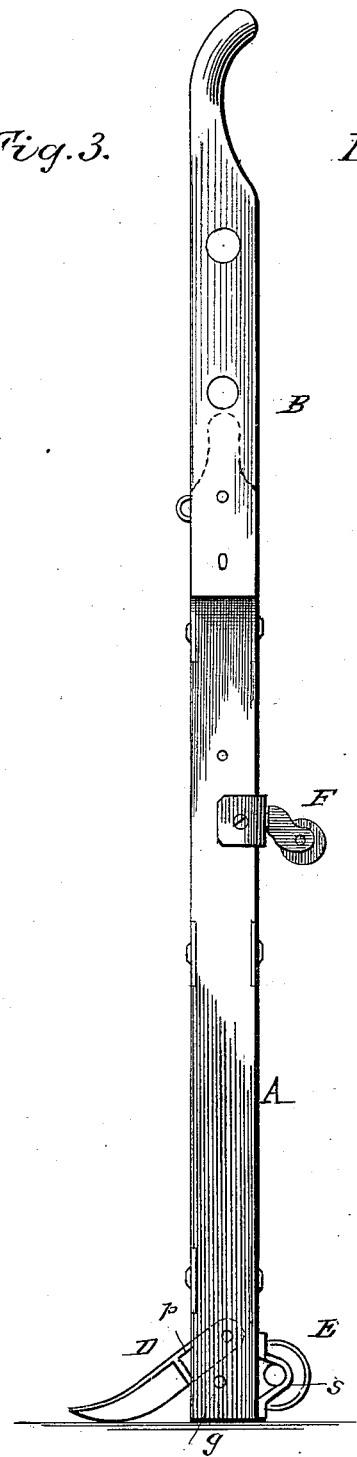
Figure 4:
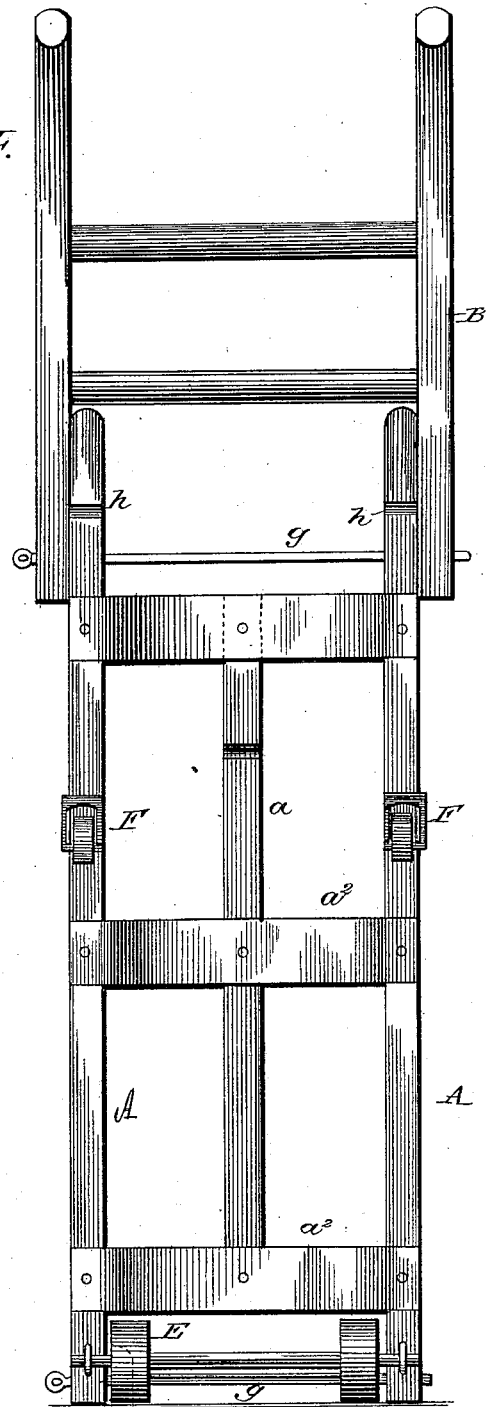

Figure 1 is a perspective view of the truck; Fig. 2, a longitudinal section of same; Fig. 3, a side elevation of the truck standing; Fig. 4, a rear view of same; Fig. 5, a detail perspective view of the central caster-support; and Figs. 6, 7, and 8, detail views of the end rest.

The frame consists of the side bars, A, and one or more central pieces, $a$, of sufficient size to give the requisite strength. The side pieces terminate at one end in the handles $m$, by which the truck is moved. The frame is braced by the iron cross-bars $a'$ $a^2$, bolted to the side and center piece. The lower one, $a^2$, is usually concaved, so as to give greater resistance to strain or to the action of the weather. The bars $a'$ $a^2$ can be reversed by simply removing the bolts and the truck be used with either surface up. A handle-extension, B, is secured to the end of the truck by means of the rods $g'$ $g^2$, which pass through openings or holes in said extension and eyebolts in the truck-frame, and hold said extension rigidly in position and at any desired angle, as in Fig. 1, using $g'$ as a pivot-rod. I obtain an upward and outward position of extension B by passing $g^2$ through the eyebolts K, then by turning down in line with the main truck. $g^2$, it will be noted, can be passed through openings in the extension and side bars. Again, by using $g^2$ as a pivot, I can turn up the extension at right angles with the main frame, the rod $g'$ passing along the groove $h$, Fig. 4, underneath the frame, and holds the extension rigidly in a vertical position. It will also be seen that this extension can be placed beneath the frame in an inclined position, and thus used for dumping purposes. Another extension may be placed at the front end of the truck and held in position by rods similar to $g'$ $g^2$. An end rest, D, is pivoted to the front end of the frame. This rest is made of wrought or cast iron, and provided with the flanges $r$, the transverse flange or rib $p'$, and the shoulder $p$, which rests on the bars A. It is pivotally and removably secured to the frame, so that the truck can be raised vertically and the rest D be inserted under a bag, box, barrel, &c., and the load turned over on the truck. Removably secured to this rest D is an auxiliary rest, T, secured to the under side of the transverse rib $p'$, as shown in Fig. 7. To prevent its falling down, a stop, $t'$, is placed thereon at each side, which rests on the edge of the rest. It is rigidly held in place by means of the sliding catch $t$, which slides up and down the rod T and passes in between the edge of rest D and the rod. A catch, R, is pivoted to one side of the frame, and is provided with one or more notches, R', so that by turning the catch over the rod $g^4$ and the pin which passes through the frame, said rest can be held in a vertical or inclined position. The flanges $r$, Fig. 1, strengthen the wheels E, and the flange or rib $p'$ gives strength to the end rest. The wheels are preferably journaled in hangers $s$, Fig. 6, which are secured to the under side of the frame A. The end rest, D, being pivotal and the face of the wheels in line with the frame A, the truck may stand on its end in a vertical position, the pivotal end rest yielding to accommodate itself to the floor or ground, so that the truck will occupy less space when not in use. At or a little in rear of the center of the frame I place a detachable caster-support, consisting of the three iron pieces or legs C C' C², united at the bottom, where the wheel or caster H is pivoted. The pieces C C' have holes near the upper end for the insertion of a rod, $g$, which passes through the truck-frame. These pieces just fit the inside of the frame A. There may also be and preferably are flanges $d^2$, which come underneath said frame-pieces A. The leg $C^2$ has a bent shoulder, $q$, having a slot or hole at $d'$, by means of which it is secured to the cross-bar $a$ by a bolt, $f$, and nut, $f'$. The caster-support is quickly detached by pulling out the rod $g$ and loosening the thumb-nut $f'$, when the truck assumes the ordinary truck form. By means of this central support the truck is raised into an inclined position such as shown in Fig. 2. The object of this central support and special advantages are as follows: The ordinary truck with the front and rear wheels cannot be used to advantage in moving freight to and from steamboats and cars on the ordinary gang-plank or inclined way. The central support is high enough to give the truck-frame a considerable incline, so that when the truck is loaded the weight is thrown forward to the end rest, D, or extension-support T. Again, on account of the single caster in the position described, the truck can be readily held to the center of a gang-plank, thus obviating the tendency to run off the plank. The truck can be guided and pushed from in front or rear. In such cases it is principally used as a dumping-truck, dumping and loading over the end. Again, as the weight is thrown forward and partially supported by the central support, the hand end of the frame is raised and out of the way, and requires no lifting. A truck constructed in this manner can be placed on a platform or store scale or in an elevator or lift, where the ordinary truck could not be used, as its length is greater than the platform or floor. If the extension B is used in elevators, it is secured in a vertical position by passing the under securing-rod underneath the main frame. In this way freight can be placed upon the truck, and elevated, without along different floors, and elevated, without lifting a pound during the removal. I have also provided casters F in rear of the central support, by means of which the truck can be used as an ordinary hand-truck, and with or without the end extensions. The casters F are placed in the position above named so that a load can be readily balanced over a step or other obstruction, or lifted or moved on the wheels E alone. If it is desired to use it as a long hand-truck, it is only necessary to pull out the rod of the handle-extension B and pass a rod through a hole in the middle of the main truck-frame. The end rest, D, may be left off, and so also the extension-rest B, when desired, and the truck then resolves itself into a simple platform or plain-surface truck. Thus it will be seen that a truck constructed as above described can be used as a long or short hand-truck, "platform," "express," "elevator," "folding," "steamboat," and "car" truck, and in each case the load is moved with a minimum lifting of the weight. As a matter of fact, in most cases the load can be moved without lifting any of the weight. Again, suppose it be desired to move a loaded truck from the sidewalk. The truck is readily balanced over the curb and step into the store or ware room by balancing over the curb or step.

Having thus described my invention, what I claim is—

1. A hand-truck having a support removably attached to the truck-frame near the center of said frame, and provided with a caster, H, said support acting to raise the rear end of the truck to an inclined position, substantially as shown, and for the purpose set forth.

2. A hand-truck provided with front wheels, a central caster, and a pivotal and removable extension, B, adapted to be rigidly secured, either inclined or at right angles above and below the main frame, or extended longitudinally with said main frame, substantially as and for the purpose set forth.

3. A hand-truck having front wheels, E, side casters, F, and central removable caster or wheel, H, substantially as and for the purpose set forth.

4. A hand-truck provided with an end rest, D, having flanges as described, and locked or held in position by a catch, R, substantially as and for the purpose set forth.

5. In a hand-truck, the combination, with the end rest, D, of the extension-support T, detachably secured to said end rest, substantially as and for the purpose set forth.

6. In a hand-truck, the combination, with the main frame braced as described, of the extension B, extension D, supplemental support T, the front wheels, and rear casters, F, substantially as and for the purpose set forth.

7. In a hand-truck, the combination, with the main frame, of a central caster-support consisting of the perforated legs C C', attached to the sides of the truck, and the slotted leg $C^2$, secured to one of the cross-bars of the frame, substantially as and for the purpose set forth.

In testimony whereof I affix my signature in presence of two witnesses.

WILLIAM W. HUGHES.

Witnesses:
GEO. W. POLAND,
J. T. MILLER.